United States Patent
Xie et al.

(10) Patent No.: US 9,007,886 B2
(45) Date of Patent: Apr. 14, 2015

(54) METHOD AND APPARATUS FOR IMPLEMENTING PREAMBLE GENERATION

(75) Inventors: Yining Xie, Shenzhen (CN); Tianmin Ren, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 267 days.

(21) Appl. No.: 13/579,406

(22) PCT Filed: Sep. 13, 2010

(86) PCT No.: PCT/CN2010/076843
§ 371 (c)(1),
(2), (4) Date: Aug. 16, 2012

(87) PCT Pub. No.: WO2011/153741
PCT Pub. Date: Dec. 15, 2011

(65) Prior Publication Data
US 2012/0314561 A1     Dec. 13, 2012

(30) Foreign Application Priority Data
Jun. 7, 2010   (CN) .......................... 2010 1 0193826

(51) Int. Cl.
 H04J 11/00     (2006.01)
 H04L 27/26     (2006.01)
 H04L 5/00      (2006.01)
(52) U.S. Cl.
 CPC ........... H04L 27/2613 (2013.01); *H04L 5/0007* (2013.01); *H04L 5/0048* (2013.01); H04L 27/2605 (2013.01)
(58) Field of Classification Search
 CPC ............ H04L 27/2605; H04L 27/2613; H04L 5/0007; H04L 5/0048
 USPC ............................ 370/350, 210, 344; 375/295
 See application file for complete search history.

(56) References Cited

U.S. PATENT DOCUMENTS

2008/0168114 A1* 7/2008 Han et al. ................. 708/209
2008/0235314 A1* 9/2008 Lee et al. .................. 708/426
(Continued)

FOREIGN PATENT DOCUMENTS

CN       101090281 A    12/2007
CN       101605397 A    12/2009
(Continued)

OTHER PUBLICATIONS

International Search Report in international application No. PCT/CN2010/076843, mailed Mar. 10, 2011.
(Continued)

*Primary Examiner* — Andrew Lai
*Assistant Examiner* — Mahmudul Hasan
(74) *Attorney, Agent, or Firm* — Lando & Anastasi, LLP

(57) ABSTRACT

The disclosure involves a method and an apparatus for implementing preamble generation. The method comprises: obtaining a first parameter value according to a root sequence number of a Zadoff-Chu (ZC) sequence; obtaining an initial value of a first sequence, according to a length and a cyclic shift value of the ZC sequence and the obtained first parameter value; performing iterative calculations on the first sequence according to the initial value of the first sequence and the first parameter value; performing iterative calculations on a second sequence according to the iteratively calculated values of the first sequence and a preset initial value of the second sequence; performing Discrete Fourier Transform (DFT) on the iteratively calculated values of the second sequence. The method and apparatus in the disclosure can achieve low complexity and high calculation precision in the calculation process and greatly reduce the amount of calculation and storage.

20 Claims, 5 Drawing Sheets

(56) References Cited

U.S. PATENT DOCUMENTS

| | | |
|---|---|---|
| 2008/0240285 A1* | 10/2008 | Han et al. .................... 375/295 |
| 2009/0073944 A1* | 3/2009 | Jiang et al. ................... 370/338 |
| 2009/0109919 A1* | 4/2009 | Bertrand et al. ............. 370/330 |
| 2009/0252260 A1 | 10/2009 | Noh et al. |
| 2009/0285337 A1* | 11/2009 | Cheng et al. .................. 375/343 |
| 2009/0290662 A1 | 11/2009 | Han et al. |
| 2009/0310703 A1* | 12/2009 | Han et al. ..................... 375/295 |
| 2010/0020905 A1* | 1/2010 | Mansour et al. ............. 375/343 |
| 2010/0098189 A1 | 4/2010 | Oketani |
| 2010/0118799 A1* | 5/2010 | Lee et al. ...................... 370/329 |
| 2010/0172299 A1* | 7/2010 | Fischer et al. ................ 370/328 |
| 2010/0222067 A1* | 9/2010 | Hooli et al. .................. 455/450 |
| 2010/0232318 A1* | 9/2010 | Sarkar .......................... 370/254 |
| 2011/0249548 A1* | 10/2011 | Gaal et al. .................... 370/206 |

FOREIGN PATENT DOCUMENTS

| | | | |
|---|---|---|---|
| CN | 101636937 A | 1/2010 | |
| CN | 101682456 A | 3/2010 | |
| EP | 2120379 | * 4/2008 | ............. H04J 13/00 |
| EP | 2120379 A1 | * 11/2009 | ............. H04J 13/00 |
| JP | 2009296255 A | 12/2009 | |

OTHER PUBLICATIONS

Physical Channels and Modulation, Mar. 2010.

* cited by examiner

METHOD AND APPARATUS FOR IMPLEMENTING PREAMBLE GENERATION

This application claims priority under 35 U.S.C. §371 PCT Application No.: PCT/CN2010/076843, filed Sep. 13, 2010, which claims priority to Chinese Patent Application No. 201010193826.6 filed Jun. 7, 2010.

TECHNICAL FIELD

The disclosure relates to the technical field of communications, particularly to a method and apparatus for implementing preamble generation.

BACKGROUND

In 3.9G and 4 G communication systems, Orthogonal Frequency Division Multiplexing (OFDM) has become a widely applied technology. In the uplink of the next-generation mobile communication system (Long Term Evolution, LTE) defined by 3GPP, User Equipment (UE) adopts Single Carrier Frequency Division Multiple Access (SC-FDMA) technology. It on the one hand inherits the orthogonal property among OFDM subcarriers and on the other hand overcomes the problem of a large PAPR (Peak to Average Power Ratio) of OFDM technology, thus the objective of raising the efficiency of the power amplifier and reducing power consumption of UE is realized. In an LTE system, the preamble sequence in a random access process adopts a Zadoff-Chu (ZC) sequence. ZC sequence is a sequence with the nature of a Constant Amplitude Zero Auto-Correlation (CAZAC) sequence and bears the characteristics in the following two aspects: (1) the sequence has desirable autocorrelation and cross-correlation. Particularly, when the length of the sequence is a prime number, it has ideal autocorrelation and cross-correlation. In this case, when two users access the system by using different ZC sequences, or different cyclic shifts of a same sequence, their mutual interference is very small; (2) both time domain and frequency domain have the property of ZC and PAPR is low, so it is suitable for the use in uplink.

In an LTE system, the time domain ZC root sequences $x_u(n)$ with a length of $N_{ZC}$=839 (format 0~3) and $N_{ZC}$=139 (format 4) are adopted respectively, where subscript u denotes root sequence number:

$$x_u(n) = \exp\left\{-j\frac{\pi \cdot u \cdot n(n+1)}{N_{ZC}}\right\},$$
$$0 \le n \le N_{ZC} - 1$$

The preamble sequence adopted by UE is a specific cyclic shift of the foregoing ZC root sequence, where cyclic shift value τ is given by the network:

$$x_u^\tau(n) = x_u((n+\tau) \bmod N_{ZC})$$

Then, the foregoing preamble sequence is transformed to frequency domain through Discrete Fourier Transform (DFT) at the first $N_{ZC}$ point, and is transmitted on the PRACH of a preamble transmission module through a subcarrier mapping module, a CP (cyclic prefix) insertion module and application of power gain factor ($\beta_{PRACH}$). The generation process of a random access preamble in the LTE system is shown in FIG. 1.

In the foregoing process, how to calculate DFT through cyclic shift ZC sequence is one of the key technical points of a preamble generation process. As the length of the ZC sequence is a prime number, its DFT can not be realized by conventional FFT method. This is because conventional FFT typically requires the length of the sequence shall be dividable and realizes DFT through series connection of base station-2, base station-3, base station-4 and other modules. If DFT is directly adopted for the calculation, the calculation will be rather complex. The common approach of the trade is to avoid direct calculation of DFT by making use of some properties of the ZC sequence. For example, to DFT $X_u^\tau(k)$ of cyclic shift ZC sequence $x_u^\tau(n)$, the following formula is tenable (extension is made based on the condition of cyclic shift):

$$X_u^\tau(k) = DFT[x_u^\tau(n)] = C \cdot x_u(\tau) \cdot \text{conj}[x_u((k \cdot \Delta + \tau) \bmod N_{ZC})]$$

Where, C is a complex constant. Its modulo value satisfies $|C|=\sqrt{N_{ZC}}$; $\Delta=u^{-1} \bmod N_{ZC}$, i.e., $(\Delta \cdot u) \bmod N_{ZC}=1$, wherein $\Delta \in [0, N_{ZC}-1]$ is a non-negative i.e., wherein $\Delta \in [0, N_{ZC}-1]$ is a non-negative integer. As preamble transmission performs one fixed phase rotation and does not affect the detection of preamble in base stations, and fixed gain can be reflected in the control of preamble transmitting power, complex constant C is omitted in the following preamble generation process.

Based on the above formula, DFT of the ZC sequence may be considered as the result of conjugate multiplication of a complex number $x_u(\tau)$ and another ZC sequence $x_u((k \cdot \Delta + \tau) \bmod N_{ZC})$. Thus complex DFT may be avoided and only the calculation of $x_u(\tau)$ and ZC sequence $x_u((k \cdot \Delta + \tau) \bmod N_{ZC})$ are needed, where variables u, k, Δ and τ are all non-negative integers in a range of $[0, N_{ZC}-1]$. Here:

$$x_u(\tau) = \exp\left\{-j\frac{\pi \cdot u \cdot \tau(\tau+1)}{N_{ZC}}\right\}$$

$$\text{conj}[x_u((k \cdot \Delta + \tau) \bmod N_{ZC})] = \exp\left\{j\pi \cdot \frac{u \cdot [(k \cdot \Delta + \tau)(k \cdot \Delta + \tau + 1)]}{N_{ZC}}\right\}$$

However, in order to calculate sequence $\text{conj}[x_u((k \cdot \Delta + \tau) \bmod N_{ZC})]$, phase factor $u \cdot [(k \cdot \Delta + \tau)(k \cdot \Delta + \tau + 1)]$ is still needed and a large amount of complex multiplication and modular arithmetic are still involved, so this algorithm is still very complex.

SUMMARY

The object of the disclosure is to provide a method and apparatus for implementing preamble generation and adopt calculation by double iteration method in the process of preamble generation. This can achieve low complexity and high calculation precision in the calculation process and greatly reduce the amount of calculation and storage.

To achieve the foregoing object, the technical solution of the disclosure is realized in the following way:

A method for implementing preamble generation, comprises:

obtaining a first parameter value according to a root sequence number of a Zadoff-Chu (ZC) sequence;

obtaining an initial value of a first sequence, according to a length and a cyclic shift value of the ZC sequence and the obtained first parameter value; and performing iterative calculations on the first sequence according to the initial value;

performing iterative calculations on a second sequence according to the iteratively calculated values of the first sequence and a preset initial value of the second sequence;

performing Discrete Fourier Transform (DFT) on the iteratively calculated values of the second sequence.

The obtaining the first parameter value according to the root sequence number of the ZC sequence may comprise: looking up in a first data table by using the root sequence number of the ZC sequence as an index, to obtain the first parameter value, wherein $\Delta=u-1 \mod N_{ZC}$ is stored in the first data table, $0 \leq u \leq N_{ZC}-1$, and $\Delta$ is an interger in a range of $[0, N_{ZC}-1]$.

The obtaining the initial value of the first sequence, according to the length and the cyclic shift value of the ZC sequence and the obtained first parameter value may comprise: if the obtained first parameter value is an odd number, obtaining the initial value of the first sequence by calculating $(\tau+(\Delta+1)/2) \mod N_{ZC}$, wherein $\tau$ denotes the cyclic shift value, $\Delta$ denotes the first parameter value and $N_{ZC}$ denotes the length of the ZC sequence; if the obtained first parameter value is not an odd number, obtaining the initial value of the first sequence by calculating $(\tau+(\Delta+1+N_{ZC})/2) \mod N_{ZC}$.

The performing iterative calculations on the first sequence according to the initial value of the first sequence and the first parameter value may comprise: performing a first iterative calculation on the first sequence according to the initial value of the first sequence and the first parameter value; and performing a k-th iterative calculation according to a (k−1)-th iteratively calculated value and the first parameter value.

The performing iterative calculations on the first sequence according to the initial value of the first sequence and the first parameter value may comprise: performing the first iterative calculation on the first sequence by using $(B(0)+\Delta) \mod N_{ZC}$, wherein $B(0)$ denotes the initial value of the first sequence.

The performing the k-th iterative calculation according to the (k−1)-th iteratively calculated value and the first parameter value may comprise: performing the k-th iterative calculation by using $(B(k-1)+\Delta) \mod N_{ZC}$, where $B(k-1)$ denotes the (k−1)-th iteratively calculated value, and k is a positive integer smaller than or equal $N_{ZC}-1$.

The performing iterative calculations on the second sequence according to the iteratively calculated values of the first sequence and the preset initial value of the second sequence may comprise: performing a first iterative calculation on the second 25 sequence according to the initial value of the first sequence and a preset initial value of the second sequence; and performing a k-th iterative calculation on the second sequence according to a (k−1)-th iteratively calculated value of the second sequence and the (k−1)-th iteratively calculated value of the first sequence.

The performing the first iterative calculation on the second sequence according to the initial value of the first sequence and the preset initial value of the second sequence may comprise: performing the first iterative calculation on the second sequence by using $(Y(0)+B(0)) \mod N_{ZC}$, wherein $Y(0)$ denotes the preset initial value of the second sequence.

The performing the k-th iterative calculation on the second sequence according to a (k−1)-th iteratively calculated value of the second sequence and the (k−1)-th iteratively calculated value of the first sequence may comprise: performing the k-th iterative calculation on the second sequence by using $(Y(k-1)+B(k-1)) \mod N_{ZC}$, wherein $Y(k-1)$ denotes the (k−1)-th iteratively calculated value of the second sequence, and k is a positive integer smaller than or equal to $N_{ZC}-1$ The performing the DFT on the iteratively calculated values of the second sequence may comprise: determining whether the k-th iteratively calculated value of the second sequence is smaller than or equal to $(N_{ZC}-1)/2$; if the k-th iteratively calculated value of the second sequence is smaller than or equal to $(N_{ZC}-1)/2$, looking up in the second data table by directly using the k-th iteratively calculated value of the second sequence as an index, to obtain a DFT output; and if the k-th iteratively calculated value of the second sequence is greater than $(N_{ZC}-1)/2$, looking up in the second data table by using $N_{ZC}$ minus the k-th iteratively calculated value of the second sequence as an index, and conjugating the look-up result to obtain the DFT output.

$$\exp\left(j2\pi \frac{n}{N_{ZC}}\right)$$

may be stored in the second data sheet, wherein n is a non-negative integer and $n \in [0, (N_{ZC}-1)/2]$.

An apparatus for implementing preamble generation, comprises:

a first query module, configured to obtain a first parameter value according to a root sequence number of a Zadoff-Chu (ZC) sequence;

an initial value calculation module, connected to the first query module, and configured to obtain an initial value of a first sequence, according to a length and a cyclic shift value of the ZC sequence and the obtained first parameter value;

a first storage module, connected to the initial value calculation module, and configured to store the initial value of the first sequence;

a first modulo adder, connected to the first storage module and the first storage module, configured to perform iterative calculations on the first sequence according to the initial value of the first sequence and the first parameter value, and to store the iterative calculations in the first storage module;

a second modulo adder, connected to the first storage module, configured to perform iterative calculations on a second sequence according to the iteratively calculated values of the first sequence, which are stored in the first storage module, and a preset initial value of the second sequence;

a second query module, configured to perform Discrete Fourier Transform (DFT) on the iteratively calculated values of the second sequence.

The apparatus may further comprise: a first database, configured to store an established first data table where $\Delta=u-1 \mod N_{ZC}$ is stored, $0 \leq u \leq N_{ZC}-1$, and $\Delta$ is an integer in a range of $[0, N_{ZC}-1]$; wherein the first query module is further configured to look up in the first data table by using the root sequence number of the ZC sequence as an index to obtain the first parameter value.

The initial value calculation module, in obtaining the initial value of the first sequence, may be configured to obtain the initial value of the first sequence by using $(\tau+(\Delta+1)/2) \mod N_{ZC}$ when the obtained first parameter value is an odd number, and to obtain the initial value of the first sequence by using $(\tau+(\Delta+1+N_{ZC})/2) \mod N_{ZC}$ when the obtained first parameter value is not an odd number.

The first modulo adder, in performing the iterative calculations on the first sequence according to the initial value of the first sequence and the first parameter value, may be configured to perform a k-th iterative calculation according to a (k−1)-th iteratively calculated value and the first parameter value; to perform a first iterative calculation on the first sequence according to the initial value of the first sequence stored in the first storage module and the first parameter value, and to store the calculation in the first storage module wherein the first iterative calculation on the first sequence is performed by the first modulo adder using $(B(0)+\Delta) \mod N_{ZC}$, where $B(0)$ denotes the initial value of the first sequence.

The first modulo adder, in performing the k-th iterative calculation according to the (k−1)-th iteratively calculated value and the first parameter value, may be configured to perform a k-th iterative calculation according to the (k−1)-th iteratively calculated value stored in the first storage module and the first parameter value and to store the calculation in the first storage module, wherein the k-th iterative calculation is performed by the first modulo adder using $(B(k-1)+\Delta) \mod N_{ZC}$, wherein $B(k-1)$ denotes the (k−1)-th iteratively calculated value, and k is a positive integer smaller than or equal to $N_{ZC}-1$.

The second modulo adder, in performing iterative calculations on the second sequence according to the iteratively calculated values of the first sequence and the preset initial value of the second sequence, may be configured to perform the first iterative calculation on the second sequence according to the initial value of the first sequence, which is stored in the first storage module, and the preset initial value of the second sequence, wherein the first iterative calculation on the second sequence is performed by the second modulo adder using $(Y(0)+B(0)) \mod N_{ZC}$, wherein $Y(0)$ denotes the preset initial value of the second sequence.

The second modulo adder, in performing the k-th iterative calculation on the second sequence according to the (k−1)-th iteratively calculated value of second sequence and the (k−1)-th iteratively calculated value of the first sequence value, may be configured to perform the k-th iterative calculation on the second sequence according to the (k−1)-th iteratively calculated value of the second sequence and the (k−1)-th iteratively calculated value of the first sequence, which are stored in the first storage module, wherein the k-th iterative calculation on the second sequence is performed by the second modulo adder using $(Y(k-1)+B(k-1)) \mod N_{ZC}$, where $Y(k-1)$ denotes the (k−1)-th iteratively calculated value of the second sequence, and k is a positive integer smaller than or equal to $N_{ZC}-1$.

The apparatus may further comprise a second storage module, which is connected to the second modulo adder, and configured to store the (k−1)-th iteratively calculated value from the second modulo adder, wherein the second query module is further configured to determine whether the k-th iteratively calculated value of the second sequence is smaller than or equal to $(N_{ZC}-1)/2$.

The apparatus may further comprise a second database, which is configured to store an established second data table, wherein $$\exp\left(j2\pi \frac{n}{N_{ZC}}\right)$$

is stored in the second data table, n is a non-negative integer and $n \in [0, (N_{ZC}-1)/2]$; wherein the second query module is further configured to determine whether the k-th iteratively calculated value of the second sequence is smaller than or equal to $(N_{ZC}-1)/2$; if the k-th iteratively calculated value of the second sequence is smaller than or equal to $(N_{ZC}-1)/2$, to look up in the second data table of the second database by directly using the k-th iteratively calculated value of the second sequence as an index, so as to obtain a DFT output; if the k-th iteratively calculated value of the second sequence is greater than $(N_{ZC}-1)/2$, to look up in the second data table of the second database by using $N_{ZC}$ minus the k-th iteratively calculated value of the second sequence as an index and to conjugate of the look-up results, so as to obtain the DFT output.

A calculation method and apparatus for implementing preamble generation provided by an embodiment of the disclosure adopt a double iteration method in the process of preamble generation, only involve integer addition, subtraction, comparison and table look-up operations and do not involve loss of fixed point operation. Relative to the prior art, the method and apparatus in the disclosure can achieve low complexity and high calculation precision in the calculation process and greatly reduce the amount of calculation and storage.

DETAILED DESCRIPTION

The general technical solution of the disclosure: the disclosure makes full use of characteristics of the ZC sequence, calculates its DFT by using a double iteration method, so as to complete a fast calculation of the DFT of the ZC sequence (with cyclic shift) through simple addition and shift calculations without multiplication.

In this embodiment, the method for fast calculation of DFT of the ZC sequence provided by an embodiment of the disclosure may be realized through the following steps.

Step A: obtaining a first parameter value according to a root sequence number of a Zadoff-Chu (ZC) sequence;

Step B: obtaining an initial value of a first sequence according to the obtained first parameter value, a length and a cyclic shift value of the ZC sequence;

Step C: performing iterative calculations on the first sequence according to the initial value of the first sequence and the first parameter value;

Step D: performing iterative calculations on a second sequence according to the iteratively calculated values of the first sequence and a preset initial value of the second 20 sequence;

Step F: performing Discrete Fourier Transform (DFT) on the iteratively calculated values of the second sequence.

A method for fast calculation of DFT of the ZC sequence provided by an embodiment of the disclosure adopts calculation by a double iteration method in the calculation process for implementing preamble generation, only involves integer addition, subtraction, comparison and table look-up operations and does not involve loss of fixed point operation. Relative to the prior art, the method can achieve low complexity and high calculation precision in the calculation process, greatly reduce the amount of calculation and storage and meet requirements for efficient software or hardware processing. The disclosure may be applied to calculate DFT in the generation process of the random access preamble sequence in a terminal or base station of an LTE mobile communication system.

The technical solution of the disclosure will now be described with reference to the drawings and specific embodiments, from which those skilled in the art may have better understandings on the disclosure and can implement it, but the embodiments are not intended to limit the disclosure.

Figure 1:
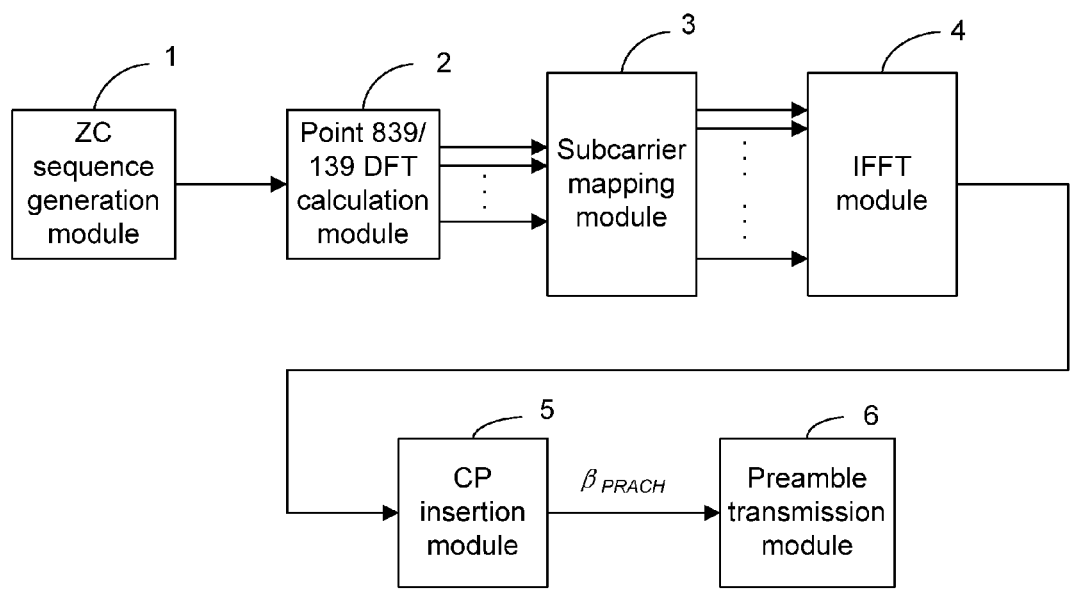
FIG. 1 is a schematic of a generation process of a random access preamble in an LTE system of the prior art.
Figure 2:
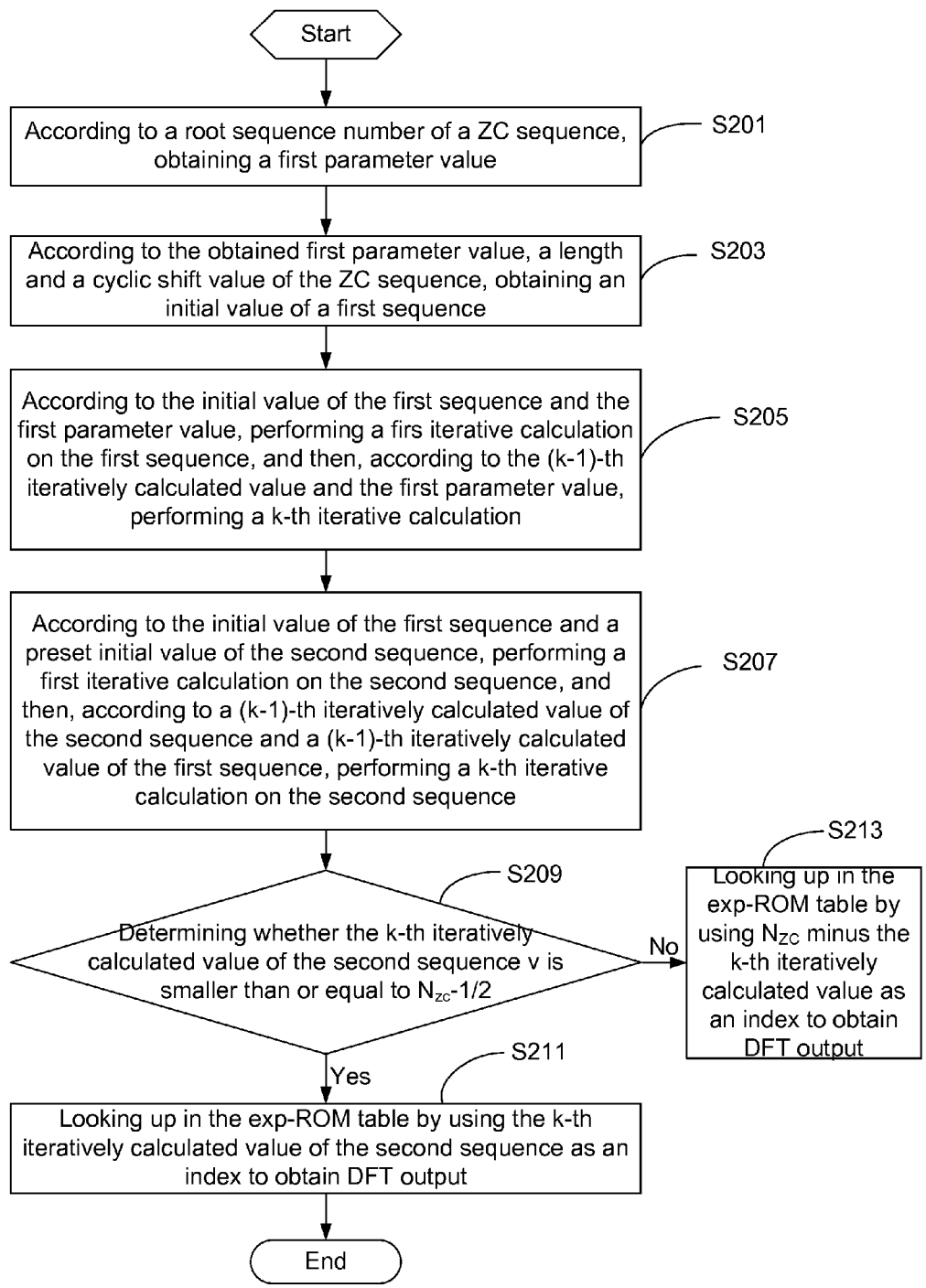
FIG. 2 is a flowchart of a method for fast calculation of DFT of a ZC sequence in the disclosure.

FIG. 2 is a flowchart of a method for fast calculation of DFT of a ZC sequence in the disclosure.

In this embodiment, before execution of the method in the disclosure, two ROM (Read-Only Memory) tables may be established and stored, which may be an exp-ROM table and a Δ-ROM table, each containing $(N_{ZC}-1)/2$ elements. In this embodiment, a first data table may be the Δ-ROM table, and a second data table may be the exp-ROM table. The storage item in the exp-ROM table is:

$$\exp\left(j2\pi\frac{n}{N_{ZC}}\right)$$

wherein n is a non-negative integer and $n \in [0, (N_{ZC}-1)/2]$ $\Delta=u^{-1} \bmod N_{ZC}$ is stored in the Δ-ROM table, corresponding to $0 \leq u \leq N_{ZC}-1$, Δ is an interger in a range of $[0, N_{ZC}-1]$. Corresponding to $N_{ZC}$ possible values u in the table, $N_{ZC}$ values Δ are stored. In this embodiment, u denotes the root sequence number of the ZC sequence, $N_{ZC}$ denotes the length of the ZC sequence, and its value in the LTE system is 839 (preamble format 0~3) or 139 (preamble format 4).

Step S201: according to a root sequence number u of the ZC sequence, obtaining a first parameter value. In this embodiment, the first parameter value may be expressed with Δ. In this embodiment, look up in the Δ-ROM table by using the root sequence number u of the ZC sequence as an index, to obtain the value Δ

Step S203: according to the obtained first parameter value, a length and a cyclic shift value of the ZC sequence, obtaining an initial value of a first sequence. In this embodiment, τ denotes the cyclic shift value, {B(k)} denotes the first sequence, and B(0) denotes the initial value of this sequence, which may be obtained according to value Δ, $N_{ZC}$ and τ. In this embodiment, if Δ is an odd number, then $B(0) \leftarrow (+(\Delta+1)/2) \bmod N_{ZC}$, it may be understood that B(0) can be obtained through $(\tau+(\Delta+1)/2) \bmod N_{ZC}$. If Δ is not an odd number, then $B(0) \leftarrow (\tau+(\Delta+1+N_{ZC})/2) \bmod N_{ZC}$, it may be understood that B(0) can be obtained through $(\tau+(\Delta+1+N_{ZC})/2) \bmod N_{ZC}$.

Step S205: according to the initial value of the first sequence and the first parameter value, performing a first iterative calculation on the first sequence, and then, according to the (k−1)-th iteratively calculated value and the first parameter value, performing a k-th iterative calculation. In this embodiment, it may be understood that the first iterative calculation is performed according to B(0) and Δ. In this embodiment, $B(k) \rightarrow (B(k-1)+\Delta) \bmod N_{ZC}$ denotes the result of the first iterative calculation, wherein $K(k \geq 1$, k is a positive integer, smaller than or equal to $N_{ZC}-1$) may denote moment k, the above formula may be understood as the k-th iterative calculation on the sequence, or performing iterative calculations $N_{ZC}-1$ times at moment 1, 2, . . . $N_{ZC}-1$, so the result B(1) of the first or moment I iterative calculation may be obtained by using $(B(0)+\Delta) \bmod N_{ZC}$, B(2) may be obtained through $(B(1)+\Delta) \bmod N_{ZC}$, and so on and so forth, B(k) may be obtained through $(B(k-1)+\Delta) \bmod N_{ZC}$ It may be understood that whenever the iterative calculation is performed once, a corresponding iterative value will be generated, in other words, the performance of the k-th iterative calculation will generate a B(k).

Step S207: according to the initial value of the first sequence and a preset initial value of the second sequence, performing a first iterative calculation on the second sequence, and then, according to a (k−1)-th iteratively calculated value of the second sequence value and a (k−1)-th iteratively calculated value of the first sequence, performing a k-th iterative calculation on the second sequence. In this embodiment, {Y(k)} denotes the second sequence, wherein k is a positive integer, smaller than or equal to $N_{ZC}-1$, and Y(0) denotes the initial value of this sequence. In this embodiment, the preset initial value Y(0) of the second sequence may be set to be 0, and it may also be understood as completing the initialization of the second sequence at moment 0. In this embodiment, this step may also be understood as performing the first iterative calculation according to B(0) and Y(0). Y(1) denotes the result of the first iterative calculation. It may be understood as the first or moment 1 iterative calculation on the second sequence. It may be expressed with $Y(1) \leftarrow (Y(0)+B(0)) \bmod N_{ZC}$. During the second or moment 2 iterative calculation on the second sequence, the result Y(2) of the second or moment 2 iterative calculation may be expressed with $Y(2) \leftarrow (Y(1)+B(1)) \bmod N_{ZC}$ and so on and so forth. $Y(k) \leftarrow (Y(k-1)+B(k-1)) \bmod N_{ZC}$ denotes the result Y(k) of the k-th or moment k iterative calculation. It may be understood that whenever iterative calculation is performed once, a corresponding iterative value will be generated, in other words, the performance of the k-th iterative calculation will generate a Y(k).

Step S209: determining whether the k-th iteratively calculated value of the second sequence is smaller than or equal to $(N_{ZC}-1)/2$.

In this embodiment, it may be understood as comparing Y(k) with $(N_{ZC}-1)/2$. As one iterative calculation will generate a value in step S207, one judgment will be executed in this step whenever an iterative value is generated in step S207. It may be understood that this step needs to execute judgment k times.

In this embodiment, if it is determined that Y(k) is smaller than or equal to $(N_{ZC}-1)/2$, step S211 will be executed.

If it is determined that Y(k) is greater than $(N_{ZC}-1)/2$, step S213 will be executed.

In this embodiment, in step S211, looking up in the exp-ROM table by the k-th iteratively calculated value of the second sequence as an index to obtain DFT output. In this embodiment, it may be understood that in step S209, as it is determined that Y(k) is smaller than or equal to $(N_{ZC}-1)/2$, Y(k) at the moment is used as an index to look up in the exp-ROM table to obtain and output a DFT value. In this embodiment, Y(k) is chosen as the value n of Formula $$\exp\left(j2\pi\frac{n}{N_{ZC}}\right)$$

in the exp-ROM table, $n \in [0, (N_{ZC}-1)/2]$, and X(k) denotes a value obtained after DFT, i.e., $$X(k) = \exp\left\{j2\pi\frac{Y(k)}{N_{ZC}}\right\}.$$

Step S213: looking up in the exp-ROM table by using $N_{ZC}$ minus the k-th iteratively calculated value as an index to obtain the DFT output. In this embodiment, it may be understood that look up in the exp-ROM table by using $N_{ZC}$ minus Y(k) as an index to obtain and output a DFT value. In this embodiment, $N_{ZC}$ minus Y(k) is chosen as the value n of Formula $$\exp\left(j2\pi \frac{n}{N_{ZC}}\right)$$

in the exp-ROM table, then the exp-ROM table is searched, and the corresponding X(k) is obtained after conjugation of the look-up result.

In this embodiment, alternatively, CODRIC method may be adopted to obtain X(k) through calculation. There is no limitation to it here.

In this embodiment, in step S209, each iteratively calculated value will be determined. After each determination, the exp-ROM table will be searched to obtain a DFT value, so after $N_{ZC}-1$ iterative calculations, and $N_{ZC}-1$ determinations, exp-ROM will be searched $N_{ZC}-1$ times. Therefore, an integral DFT value {X(k)} will be obtained. After the DFT value {X(k)} generated this moment is subject to follow-up subcarrier mapping, CP insertion and application of power gain factor ($\beta_{PRACH}$), a random access preamble sequence in the LTE mobile communication system will be generated, and transmitted in a PRACH.

A method for fast calculation of DFT of the ZC sequence provided by an embodiment of the disclosure adopts calculation by a double iteration method in the calculation process for realizing preamble generation, only involves integer addition, subtraction, comparison and table look-up operations and does not involve loss of fixed point operation. Relative to the prior art, the method can achieve low complexity and high calculation precision in the calculation process, greatly reduce the amount of calculation and storage and meet the requirements for efficient software or hardware processing. The disclosure may be applied to calculate DFT in the generation process of the random access preamble sequence in a terminal or base station of an LTE mobile communication system.

Figure 3:
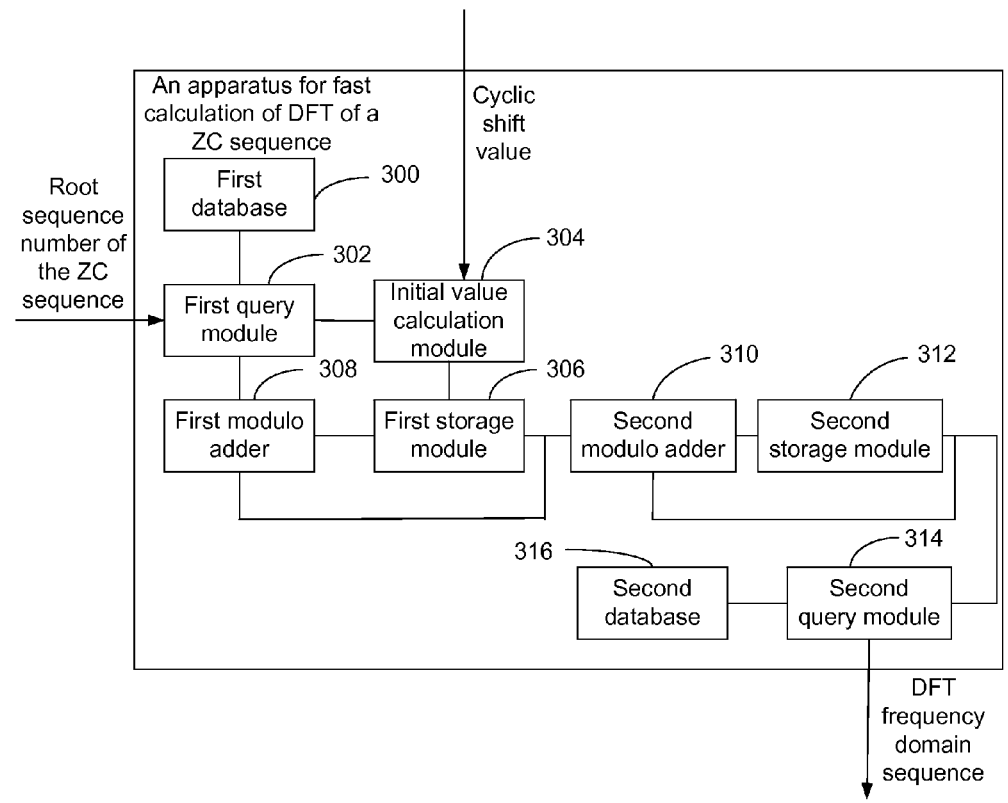
FIG. 3 is a structural schematic of an apparatus for fast calculation of DFT of a ZC sequence in the disclosure.

FIG. 3 is a structural schematic of an apparatus for fast calculation of DFT of a ZC sequence in the disclosure.

In this embodiment, the apparatus for fast calculation of DFT of the ZC sequence is applied to calculate DFT in the generation process of the random access preamble sequence in a terminal or base station in an LTE mobile communication system. In this embodiment, after the apparatus for fast calculation of DFT of the ZC sequence performs DFT on the received ZC sequence, it outputs an integral DFT value {X(k)}, thereby after the DFT value generated this moment is subject to follow-up subcarrier mapping, CP insertion and application of power gain factor ($\beta_{PRACH}$), a random access preamble sequence in the LTE mobile communication system will be generated, and transmitted in a PRACH.

In this embodiment, the apparatus for fast calculation of DFT of the ZC sequence may comprise a first database 300, a first query module 302, an initial value calculation module 304, a first storage module 306, a first modulo adder 308, a second modulo adder 310, a second storage module 312, a second query module 314 and a second database 316.

In this embodiment, the first database 300 is configured to store an established first data table, which may be a Δ-ROM table where Δ=u−1 mod $N_{ZC}$ is stored, 0≤u≤$N_{ZC}$−1 and Δ is an interger in a range of [0, $N_{ZC}$−1]. In the table, corresponding to N, possible values u, $N_{ZC}$ values Δ are stored. In this embodiment, u denotes the root sequence number of the ZC sequence, 0≤u≤$N_{ZC}$−1 denotes the length of the ZC sequence, and its value in the LTE system is 839 (preamble format 0~3) or 139 (preamble format 4). The second database 316 is configured to store an established second data table, which may be an exp-ROM table containing ($N_{ZC}$−1)/2 elements.

$$\exp\left(j2\pi \frac{n}{N_{ZC}}\right)$$

is stored in the second data sheet, n is a non-negative integer and n∈[0, ($N_{ZC}$−1)/2]. In this embodiment, $N_{zc}$ denotes the length of the ZC sequence, and its value in the LTE system is 839 (preamble format 0~3) or 139 (preamble format 4).

The first query module 302 is connected to the first database 300, and configured to obtain a first parameter value according to a root sequence number of a ZC sequence. It may be understood as looking up in the first database 300 according to the received root sequence number of the ZC sequence u to obtain the first parameter value. In this embodiment, Δ denotes the first parameter value. In this embodiment, the root sequence number of the ZC sequence u may be used as an index to look up in the Δ-ROM table to obtain the Δ.

The initial value calculation module 304 is connected to the first query module 302, and configured to obtain an initial value of a first sequence, according to the first parameter value obtained by the first query module 302, a length and a cyclic shift value of the ZC sequence. It may be understood as obtaining the initial value of the first sequence according to the first parameter value obtained by the first query module 302, the length and the cyclic shift value of the ZC sequence. In this embodiment, τ denotes the cyclic shift value, {B(k)} denotes the first sequence, B(0) denotes the initial value of this sequence, it may be understood as obtaining B(0) according to Δ, $N_{ZC}$ and τ. In this embodiment, if Δ is an odd number, then B(0)←(τ+(Δ+1)/2)mod $N_{ZC}$, it may be understood that B(0) may be obtained by using (τ+(Δ+1)/2)mod $N_{ZC}$. If Δ is not an odd number, then B(0)←(τ+(Δ+1+$N_{ZC}$)/2)mod $N_{ZC}$, it may be understood that B(0) may be obtained by using (τ+(Δ+1+$N_{ZC}$)/2)mod $N_{ZC}$.

The first storage module 306 is connected to the initial value calculation module 304, and configured to store the initial value of the first sequence obtained by the initial value calculation module 304.

The first modulo adder 308 is connected to the first query module 302 and the first storage module 306 respectively, configured to perform the iterative calculations on the first sequence according to the initial value of the first sequence stored in the first query module 302 and the first parameter value obtained by the first query module 302, and to store the iterative calculations in the first storage module 302. In this embodiment, it may be understood as firstly performing a first iterative calculation on the first sequence according to the initial value of the first sequence stored in the first query module 302 and the first parameter value obtained by the first query module 302. In this embodiment, the first modulo adder 308 is further configured to store the first iteratively calculated value in the first storage module 306. In this embodiment, the first modulo adder 308 is further configured to perform a second iterative calculation, according to the first iteratively calculated value stored in the first storage module 306 and the first parameter value obtained by the first query module 302, and to store the second iteratively calculated value in the first storage module 306; and so on and so forth. The first modulo adder 308 is further configured to perform a k-th iterative calculation according to a (k−1)-th iteratively calculated value stored in the first storage module 306 and the first parameter value obtained by the first query module 302, and to store the k-th iteratively calculated value in the first storage module 306. In this embodiment, it may be explained with the following description: performing a first iterative calculation according to B(0) and Δ. In this embodiment, B(k)→(B(k−1)+Δ)mod $N_{zc}$ denotes the result of the first iterative calculation, wherein k (k is a positive integer, smaller than or equal to $N_{zc}$−1) denote moment k, the above formula may be understood as the k-th iterative calculation on the sequence, or performing iterative calculation $N_{zc}$−1 times at moment 1, 2, . . . , $N_{zc}$−1, so the result B(1) of the first or moment 1 iterative calculation may be obtained by using (B(0)+Δ)mod $N_{ZC}$, B(2) may be obtained by using (B(1)+Δ) mod $N_{ZC}$, and so on and so forth, B(k) may be obtained by using (B(k−1)+Δ)mod $N_{ZC}$. It may be understood that whenever the iterative calculation is performed once, a corresponding iterative value will be generated, in other words, the performance of the k-th iterative calculation will generate a B(k). Therefore, the first storage module 306 stores a plurality of iteratively calculated values.

The second modulo adder 310 is connected to the first storage module 306 and the second storage module 312, and configured to perform iterative calculations on a second sequence according to the iteratively calculated values of the first sequence, which are stored in the first storage module 306, and a preset initial value of the second sequence. In this embodiment, it may be understood as firstly performing a first iterative calculation on the second sequence according to an initial value of the first sequence and the preset initial value of the second sequence, which are stored in the first storage module 306, and storing the first iteratively calculated value in the second storage module 312. Likewise, the second modulo adder 310 is further configured to perform a k-th iterative calculation on the second sequence according to the (k−1)-th iteratively calculated value of the second sequence value, which is stored in the second storage module 312, and the (k−1)-th iteratively calculated value of the first sequence, which is stored in the first storage module 306, and to store the k-th iteratively calculated value in the second storage module 312. In this embodiment, {Y(k)} denotes the second sequence, wherein k is a positive integer, smaller than or equal to $N_{ZC}$−1. Y(0) denotes the initial value of this sequence. In this embodiment, the preset initial value of the second sequence Y(0) may be set to be 0, and it may also be understood as completing the initialization of the second sequence at moment 0. In this embodiment, this step may also be understood as performing the first iterative calculation according to B(0) and Y(0). Y(1) denotes the result of the first iterative calculation. It may be understood as the first or moment 1 iterative calculation on the second sequence and Y(1)←(Y(0)+B(0))mod $N_{ZC}$. During the second or moment 2 iterative calculation on the second sequence, Y(2)←(Y(1)+B(1))mod $N_{ZC}$ denotes the result Y(2) of the second or moment 2 iterative calculation, and so on and so forth. Y(k)←(Y(k−1)+B(k−1))mod $N_{ZC}$ denotes the result Y(k) of the k-th or moment k iterative calculation. It may be understood that whenever iterative calculation is performed once, a corresponding iterative value will be generated, in other words, the performance of the k-th iterative calculation will generate a Y(k). Therefore, the second storage module 312 stores a plurality of iteratively calculated values.

The second query module 314 is connected to the second storage module 312 and the second database 316, and configured to obtain Discrete Fourier Transform (DFT) on the iteratively calculated values of the second sequence. In this embodiment, it may be understood as looking up in the second database 316 according to the k-th iteratively calculated value, which is stored in the second storage module 312, to obtain the DFT value. In this embodiment, the second query module 314 is further configured to determine whether the k-th iteratively calculated value of the second sequence is smaller than or equal to ($N_{ZC}$−1)/2. In this embodiment, one iterative calculation will generate a value, so the second query module 314 needs to execute determination k times.

In this embodiment, when the second query module 314 is configured to determine that Y(k) is smaller than or equal to ($N_{ZC}$−1)/2, to look up in the exp-ROM table of the second database by directly using the k-th iteratively calculated value of the second sequence which is stored in the second storage module 312 as an index, so as to obtain and output the corresponding DFT value.

In this embodiment, when the second query module 314 is configured to determine that Y(k) is greater than ($N_{ZC}$−1)/2, to look up in the exp-ROM table of the second database by using $N_{ZC}$ minus the k-th iteratively calculated value of the second sequence which is stored in the second storage module 312 as an index, and to conjugate of the look-up results, so as to obtain the DFT output.

In this embodiment, alternatively, CODRIC method may be adopted to obtain X(k) through calculation. There is no limitation to it here.

In this embodiment, the second query module 314 will determine each iteratively calculated value, and after each determination, it will look up in the exp-ROM table to obtain a DFT value, so after $N_{ZC}$−1 iterative calculations, and $N_{ZC}$−1 determinations, exp-ROM will be searched $N_{ZC}$−1 times. Therefore, an integral DFT value {X(k)} will be obtained. After the DFT value {X(k)} generated this moment is subject to follow-up subcarrier mapping, CP insertion and application of power gain factor ($\beta_{PRACH}$), a random access preamble sequence in the LTE mobile communication system will be generated, and transmitted in PRACH.

The apparatus for fast calculation of DFT of the ZC sequence provided by an embodiment of the disclosure adopts calculation by a double iteration method in the calculation process for realizing preamble generation, only involves integer addition, subtraction, comparison and table look-up operations and does not involve loss of fixed point operation. Relative to the prior art, the apparatus can achieve low complexity and high calculation precision in the calculation process, greatly reduce the amount of calculation and storage and meet the requirements for efficient software or hardware processing. The disclosure may be applied to calculate DFT in the generation process of the random access preamble sequence in a terminal or base station of an LTE mobile communication system.

Figure 4:
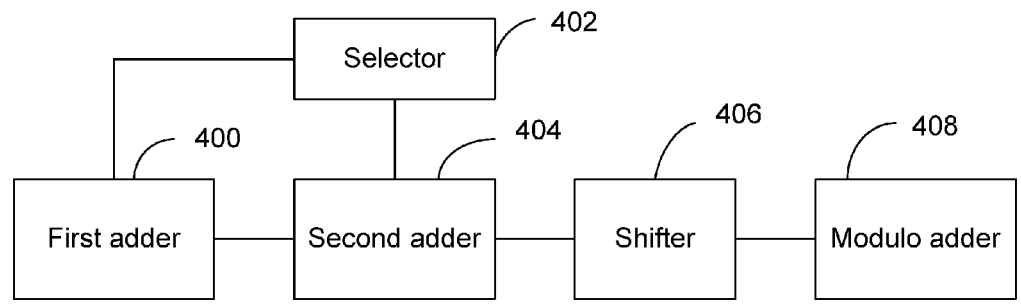
FIG. 4 is a structural schematic of an initialization calculation module in the apparatus for fast calculation of DFT of the ZC sequence as shown in FIG. 3.

FIG. 4 is a structural schematic of an initialization calculation module in the apparatus for fast calculation of DFT of the ZC sequence as shown in FIG. 3.

In this embodiment, the initialization calculation module comprises a first adder 400, a selector 402, a second adder 404, a shifter 406, and a modulo adder 408.

In this embodiment, the first adder 400 is configured to add 1 to the first parameter value obtained by the first query module 302. The selector 402 is connected to the first adder 400 and the second adder 404, and configured to determine, according to the lowest digit of the first parameter value, whether $N_{ZC}$ needs to be added to the value output by the first adder 400 through the second adder 404. In this embodiment, if the lowest digit of Δ is an odd number, then it is determined that there is no need to add $N_{ZC}$ to the value output by the first adder 400 through the second adder 404. If the lowest digit of Δ is not an odd number, then it is determine that there is the need to add $N_{ZC}$ to the value output by the first adder 400 through the second adder 404.

Figure 5:
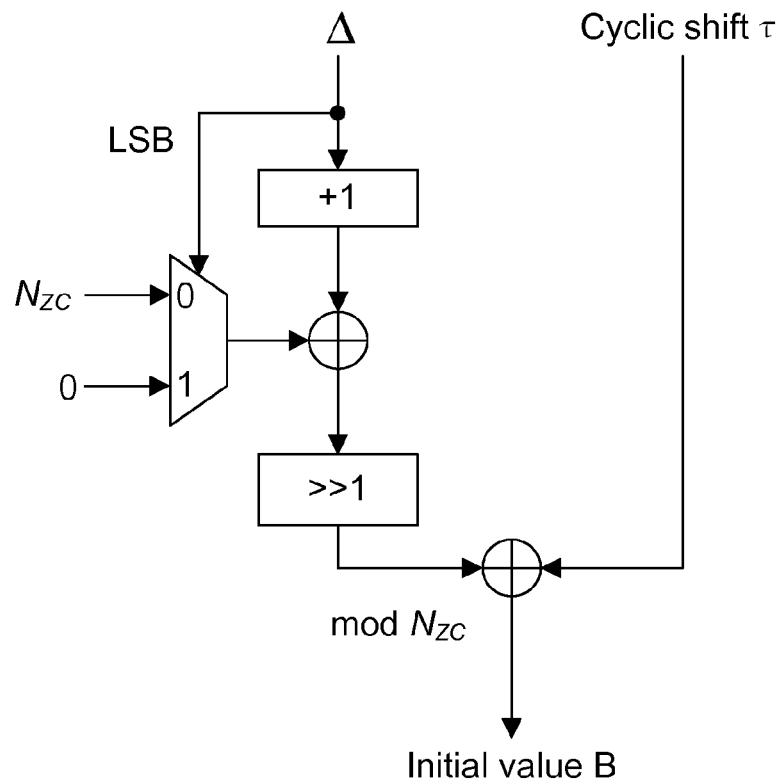
FIG. 5 is a specific circuit diagram of the initialization calculation module as shown in FIG. 4.

The shifter 406 is connected to the second adder 404, and configured to shift the value output by the second adder 404 rightwards by one digit. The modulo adder 408 is connected to the shifter 406, and configured to perform modulo calculation on the value output by the shifter 406 and the cyclic shift value. In this embodiment, it may be understood as: if Δ is an odd number, then $B(0)\leftarrow(\tau+(\Delta+1)/2)\bmod N_{ZC}$ denotes the value output by the modulo adder 408, it may be understood that B(0) may be obtained by using $(\tau+(\Delta+1)/2)\bmod N_{ZC}$. If Δ is not an odd number, then $B(0)\leftarrow(V+(\Delta+1+N_{ZC})/2)\bmod N_{ZC}$ denotes the value output by the modulo adder 408, it may be understood that B(0) may be obtained by using $(\tau+(\Delta+1+N_{ZC})/2)\bmod N_{ZC}$. In this embodiment, FIG. 5 is a specific circuit diagram of the initialization calculation module as shown in FIG. 4

Figure 6:
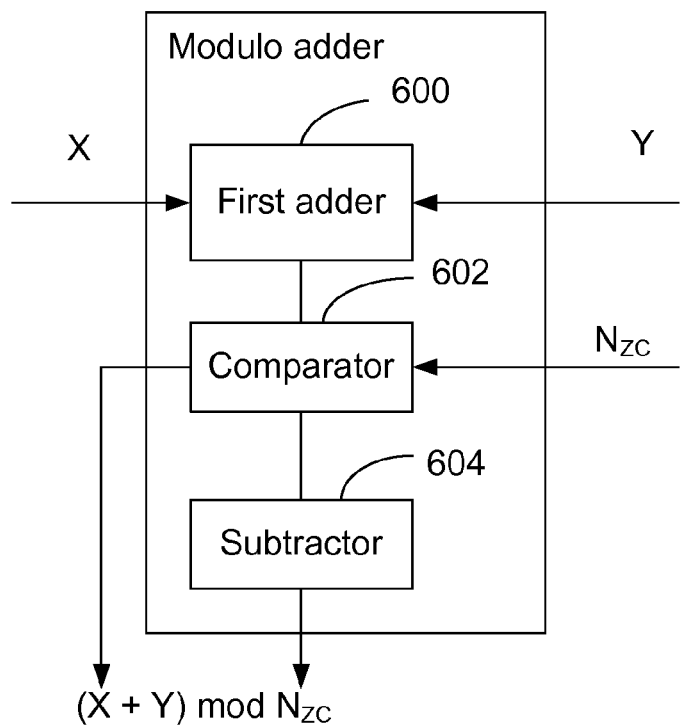
FIG. 6 is a structural schematic of a modulo adder in the apparatus for fast calculation of DFT of the ZC sequence as shown in FIG. 3.

FIG. 6 is a structural schematic of a modulo adder in the apparatus for fast calculation of DFT of the ZC sequence as shown in FIG. 3.

In this embodiment, the modulo adder comprises a first adder 600, a comparator 602, and a subtractor 604. In this embodiment, the modulo adder may receive two input values, such as: X and Y. Through addition calculation of the first adder 600, $(X+Y)\bmod N_{ZC}$ may be used as an output value of the modulo adder.

In this embodiment, the first adder 600 is configured to receive two input values, and perform addition calculation on the two input values.

The comparator 602 is connected to the first adder 600 and the subtractor 604 respectively, and configured to compare the value output by the first adder 600 with $N_{ZC}$. If the value output by the first adder 600 is smaller than $N_{ZC}$, the value output by the first adder 600 will be used as the output value of the modulo adder. If the comparator 602 determines that the value output by the first adder 600 is smaller than $N_{ZC}$, then it will inform the subtractor 604 to subtract $N_{ZC}$ from the value output by the first adder 600.

Figure 7:
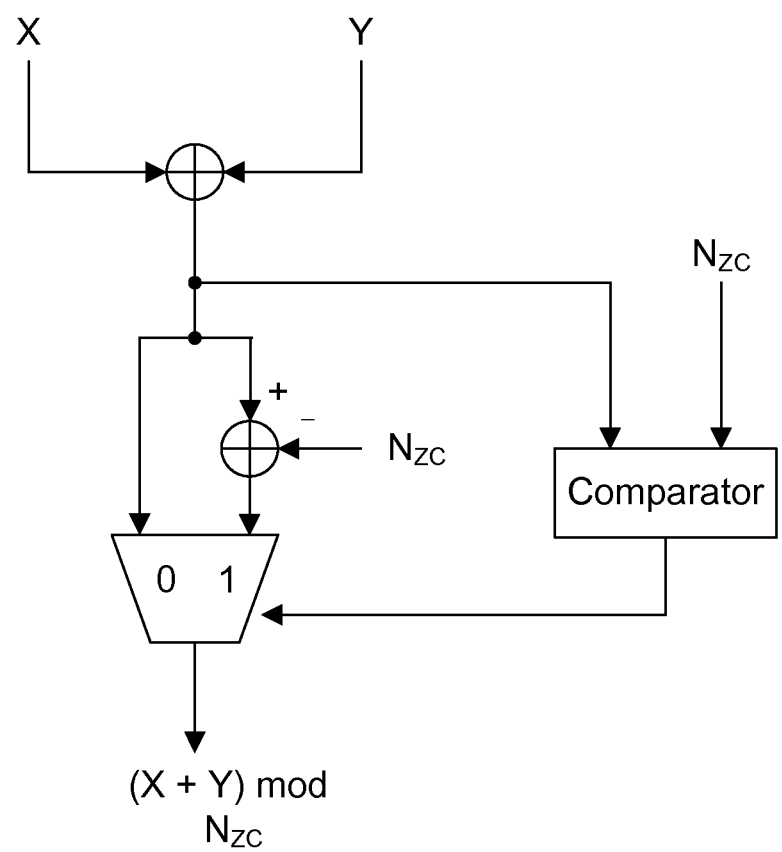
FIG. 7 is a specific circuit diagram of a modulo adder as shown in FIG. 6.

The subtractor 604 is connected to the comparator 602, and configured to subtract $N_{ZC}$ from the value output by the first adder 600 and choose the value obtained after subtraction of $N_{ZC}$ as the value output by the modulo adder when the comparator 602 determines that the value output by the first adder 600 is not smaller than $N_{ZC}$. In this embodiment, FIG. 7 is a specific circuit diagram of a modulo adder as shown in FIG. 6.

Apparently, the calculation method and apparatus for implementing preamble generation provided by an embodiment of the disclosure adopt calculation by a double iteration method in the process of preamble generation, only involves integer addition, subtraction, comparison and table look-up operations and do not involve loss of fixed point operation. Relative to the prior art, the method and apparatus can achieve low complexity and high calculation precision in the calculation process and greatly reduce the amount of calculation and storage.

The foregoing descriptions are preferred embodiments of the disclosure and are not intended to limit the claims of the disclosure. All equivalent structures or equivalent flow transformations made by making use of the content of the description and accompanying drawings of the disclosure, or direct or indirect application of them to other related technical fields all shall be within the protection scope of the disclosure.

What is claimed is:

1. A method for implementing preamble generation, comprising:

obtaining a first parameter value according to a root sequence number of a Zadoff-Chu (ZC) sequence;

obtaining an initial value of a first sequence, according to a length and a cyclic shift value of the ZC sequence and the obtained first parameter value;

performing, by a first modulo adder, iterative calculations on the first sequence according to the initial value of the first sequence and the first parameter value;

performing, by a second modulo adder, iterative calculations on a second sequence according to the iteratively calculated values of the first sequence and a preset initial value of the second sequence;

performing Discrete Fourier Transform (DFT) on the iteratively calculated values of the second sequence.

2. The method according to claim 1, wherein obtaining the first parameter value according to the root sequence number of the ZC sequence comprises:

looking up in a first data sheet by using the root sequence number of the ZC sequence as an index, to obtain the first parameter value, wherein $\Delta=u^{-1}\bmod N_{ZC}$ is stored in the first data table, $0\leq u\leq N_{ZC}-1$, and Δ is an interger in a range of $[0, N_{ZC}-1]$ wherein u denotes the root sequence number of the ZC sequence, $N_{ZC}$ denotes the length of the ZC sequence, and its value in the Long Term Evolution (LTE) system is 839 (preamble format 0~3) or 139 (preamble format 4), and Δ denotes the first parameter value.

3. The method according to claim 1, wherein obtaining the initial value of the first sequence, according to the length and the cyclic shift value of the ZC sequence and the obtained first parameter value comprises:

if the obtained first parameter value is an odd number, obtaining the initial value of the first sequence by calculating $(\tau+(\Delta+1)/2)\bmod N_{ZC}$, wherein τ denotes the cyclic shift value, Δ denotes the first parameter value and $N_{ZC}$ denotes the length of the ZC sequence;

if the obtained first parameter value is not an odd number, obtaining the initial value of the first sequence by calculating $(\tau+(\Delta+1+N_{ZC})/2)\bmod N_{ZC}$.

4. The method according to claim 1, wherein performing, by the first modulo adder, iterative calculations on the first sequence according to the initial value of the first sequence and the first parameter value comprises:

performing a first iterative calculation on the first sequence according to the initial value of the first sequence and the first parameter value; and performing a k-th iterative calculation according to a (k−1)-th iteratively calculated value and the first parameter value.

5. The method according to claim 4, wherein performing, by the first modulo adder, iterative calculations on the first sequence according to the initial value of the first sequence and the first parameter value comprises:

performing the first iterative calculation on the first sequence by using $(B(0)+\Delta)\bmod N_{ZC}$ wherein B(0) denotes the initial value of the first sequence, and $N_{ZC}$ denotes the length of the ZC sequence, and its value in the LTE system is 839 (preamble format 0~3) or 139 (preamble format 4).

6. The method according to claim 4, wherein performing the k-th iterative calculation according to the (k−1)-th iteratively calculated value and the first parameter value comprises:

performing the k-th iterative calculation by using $(B(k-1)+\Delta)\bmod N_{ZC}$, where B(k−1) denotes the (k−1)-th iteratively calculated value, and k is a positive integer smaller than or equal $N_{ZC}-1$;

wherein $N_{ZC}$ denotes the length of the ZC sequence, and its value in the LTE system is 839 (preamble format 0~3) or 139 (preamble format 4).

7. The method according to claim 4, wherein performing, by a second modulo adder, iterative calculations on the second sequence according to the iteratively calculated values of the first sequence and the preset initial value of the second sequence comprises:
  performing a first iterative calculation on the second sequence according to the initial value of the first sequence and a preset initial value of the second sequence; and
  performing a k-th iterative calculation on the second sequence according to a (k−1)-th iteratively calculated value of the second sequence and the (k−1)-th iteratively calculated value of the first sequence.

8. The method according to claim 7, wherein performing the first iterative calculation on the second sequence according to the initial value of the first sequence and the preset initial value of the second sequence comprises:
  performing the first iterative calculation on the second sequence by using $(Y(0)+B(0))\bmod N_{ZC}$, wherein $Y(0)$ denotes the preset initial value of the second sequence, $B(0)$ denotes the initial value of the first sequence, and $N_{ZC}$ denotes the length of the ZC sequence, and its value in the LTE system is 839 (preamble format 0~3) or 139 (preamble format 4).

9. The method according to claim 7, wherein performing the k-th iterative calculation on the second sequence according to a (k−1)-th iteratively calculated value of the second sequence and the (k−1)-th iteratively calculated value of the first sequence comprises:
  performing the k-th iterative calculation on the second sequence by using $(Y(k-1)+B(k-1))\bmod N_{ZC}$, wherein $Y(k-1)$ denotes the (k−1)-th iteratively calculated value of the second sequence, $B(k-1)$ denotes the (k−1)-th iteratively calculated value of the first sequence, k is a positive integer smaller than or equal to $N_{ZC}-1$, and $N_{ZC}$ denotes the length of the ZC sequence, and its value in the LTE system is 839 (preamble format 0~3) or 139 (preamble format 4).

10. The method according to claim 1, wherein performing the DFT on the iteratively calculated values of the second sequence comprises:
  determining whether the k-th iteratively calculated value of the second sequence is smaller than or equal to $(N_{ZC}-1)/2$;
  if the k-th iteratively calculated value of the second sequence is smaller than or equal to $(N_{ZC}-1)/2$, looking up in the second data table by directly using the k-th iteratively calculated value of the second sequence as an index, to obtain a DFT output; and
  if the k-th iteratively calculated value of the second sequence is greater than $(N_{ZC}-1)/2$, looking up in the second data table by using $N_{ZC}$ minus the k-th iteratively calculated value of the second sequence as an index, and conjugating the look-up result to obtain the DFT output;
  wherein $N_{ZC}$ denotes the length of the ZC sequence, and its value in the LTE system is 839 (preamble format 0~3) or 139 (preamble format 4).

11. The method according to claim 10, wherein $$\exp\left(j2\pi\frac{n}{N_{ZC}}\right)$$

is stored in the second data table, wherein n is a non-negative integer and $n\in[0, (N_{ZC}-1)/2]$.

12. An apparatus for implementing preamble generation, comprising:
  a first query module, configured to obtain a first parameter value according to a root sequence number of a Zadoff-Chu (ZC) sequence;
  an initial value calculation module, connected to the first query module, and configured to obtain an initial value of a first sequence, according to a length and a cyclic shift value of the ZC sequence and the obtained first parameter value;
  a first storage module, connected to the initial value calculation module, and configured to store the initial value of the first sequence;
  a first modulo adder, connected to the first storage module and the first query module, configured to perform iterative calculations on the first sequence according to the initial value of the first sequence and the first parameter value, and to store the iterative calculations in the first storage module;
  a second modulo adder, connected to the first storage module, configured to perform iterative calculations on a second sequence according to the iteratively calculated values of the first sequence, which are stored in the first storage module, and a preset initial value of the second sequence;
  a second query module, configured to perform Discrete Fourier Transform (DFT) on the iteratively calculated values of the second sequence.

13. The apparatus according to claim 12, further comprising:
  a first database, configured to store an established first data table where $\Delta=u^{-1}\bmod N_{ZC}$ is stored, $0\le u\le N_{ZC}-1$, and $\Delta$ is an integer in a range of $[0, N_{ZC}-1]$, where u denotes the root sequence number of the ZC sequence, $N_{ZC}$ denotes the length of the ZC sequence, and its value in the Long Term Evolution (LTE) system is 839 (preamble format 0~3) or 139 (preamble format 4), and $\Delta$ denotes the first parameter value:
  wherein the first query module is further configured to look up in the first data table by using the root sequence number of the ZC sequence as an index to obtain the first parameter value.

14. The apparatus according to claim 12, wherein the initial value calculation module, in obtaining the initial value of the first sequence, is configured to obtain the initial value of the first sequence by using $(\tau+\Delta+1)/2)\bmod N_{ZC}$ when the obtained first parameter value is an odd number, and to obtain the initial value of the first sequence by using $(\tau+(\Delta+1+N_{ZC})/2)\bmod N_{ZC}$ when the obtained first parameter value is not an odd numbers
  wherein $\tau$ denotes the cyclic shift value, $\Delta$ denotes the first parameter value, and $N_{ZC}$ denotes the length of the ZC sequence, and its value in the LTE system is 839 (preamble format 0~3) or 139 (preamble format 4).

15. The apparatus according to claim 12, wherein the first modulo adder, in performing the iterative calculation on the first sequence according to the initial value of the first sequence and the first parameter value, is configured to perform a k-th iterative calculation according to a (k−1)-th iteratively calculated value and the first parameter value;
  to perform a first iterative calculation on the first sequence according to the initial value of the first sequence stored in the first storage module and the first parameter value, and to store the calculation in the first storage module wherein the first iterative calculation on the first sequence is performed by the first modulo adder using $(B(0)+\Delta) \mod N_{ZC}$, where $B(0)$ denotes the initial value of the first sequence, $\Delta$ denotes the first parameter value, and $N_{ZC}$ denotes the length of the ZC sequence, and its value in the LTE system is 839 (preamble format 0~3) or 139 (preamble format 4).

16. The apparatus according to claim 12, wherein the first modulo adder, in perform the k-th iterative calculation according to the (k−1)-th iteratively calculated value and the first parameter value, is configured to perform a k-th iterative calculation according to the (k−1)-th iteratively calculated value stored in the first storage module and the first parameter value and to store the calculation in the first storage module, wherein the k-th iterative calculation is performed by the first modulo adder using $(B(k-1)+\Delta) \mod N_{ZC}$, wherein $B(k-1)$ denotes the (k−1)-th iteratively calculated value, is a positive integer smaller than or equal to $N_{ZC}-1$, $\Delta$ denotes the fast parameter value, and $N_{ZC}$ denotes the length of the ZC sequence, and its value in the LTE system is 839 (preamble format 0~3) or 139 (preamble format 4).

17. The apparatus according to claim 12, wherein the second modulo adder, in performing iterative calculations on the second sequence according to the iteratively calculated values of the first sequence and the preset initial value of the second sequence, is configured to perform the first iterative calculation on the second sequence according to the initial value of the first sequence, which is stored in the first storage module, and the preset initial value of the second sequence, wherein the first iterative calculation on the second sequence is performed by the second modulo adder using $(Y(0)+B(0)) \mod N_{ZC}$, wherein $Y(0)$ denotes the preset initial value of the second sequence. $B(0)$ denotes the initial value of the first sequence, and $N_{ZC}$ denotes the length of the ZC sequence, and its value in the LTE system is 839 (preamble format 0~3) or 139 (preamble format 4).

18. The apparatus according to claim 12, wherein the second modulo adder, in performing the k-th iterative calculation on the second sequence according to the (k−1)-th iteratively calculated value of second sequence and the (k−1)-th iteratively calculated value of the first sequence value, is configured to perform the k-th iterative calculation on the second sequence according to the (k−1)-th iteratively calculated value of the second sequence and the (k−1)-th iteratively calculated value of the first sequence, which are stored in the first storage module, wherein the k-th iterative calculation on the second sequence is performed by the second modulo adder using $(Y(k-1)+B(k-1)) \mod N_{ZC}$, where $Y(k-1)$ denotes the (k−1)-th iteratively calculated value of the second sequence, $B(k-1)$ denotes the (k−1)-th iteratively calculated value of the first sequence, k is a positive integer smaller than or equal to $N_{ZC}-1$, and $N_{ZC}$ denotes the length of the ZC sequence, and its value in the LTE system is 839 (preamble format 0~3) or 139 (preamble format 4).

19. The apparatus according to claim 12, further comprising a second storage module, which is connected to the second modulo adder, and configured to store the (k−1)-th iteratively calculated value from the second modulo adder, wherein the second query module is further configured to determine whether the k-th iteratively calculated value of the second sequence is smaller than or equal to $(N_{ZC}-1)/2$, where $N_{ZC}$ denotes the length of the ZC sequence, and its value in the LTE system is 839 (preamble format 0~3) or 139 (preamble format 4).

20. The apparatus according to claim 19, further comprising a second database, which is configured to store an established second data table, wherein $$\exp\left(j2\pi \frac{n}{N_{ZC}}\right)$$

is stored in the second data table, n is a non-negative integer and $n \in [0, (N_{ZC}-1)/2]$;

wherein the second query module is further configured to determine whether the k-th iteratively calculated value of the second sequence is smaller than or equal to $(N_{ZC}-1)/2$; if the k-th iteratively calculated value of the second sequence is smaller than or equal to $(N_{ZC}-1)/2$, to look up in the second data table of the second database by directly using the k-th iteratively calculated value of the second sequence as an index, so as to obtain a DFT output; if the k-th iteratively calculated value of the second sequence is greater than $(N_{ZC}-1)/2$, to look up in the second data table of the second database by using $N_{ZC}$ minus the k-th iteratively calculated value of the second sequence as an index and to conjugate of the look-up results, so as to obtain the DFT output.

\* \* \* \* \*

UNITED STATES PATENT AND TRADEMARK OFFICE
CERTIFICATE OF CORRECTION

PATENT NO. : 9,007,886 B2
APPLICATION NO. : 13/579406
DATED : April 14, 2015
INVENTOR(S) : Xie et al.

Page 1 of 1

It is certified that error appears in the above-identified patent and that said Letters Patent is hereby corrected as shown below:

In the Claims:

Column 16, claim 14, line 53, delete "numbers" and insert --number--.

Column 17, claim 16, line 18, insert --k-- before "is".

Column 17, claim 16, line 19, delete "fast" and insert --first--.

Signed and Sealed this
Eighteenth Day of August, 2015

Michelle K. Lee
*Director of the United States Patent and Trademark Office*